United States Patent [19]
Jacobs et al.

[11] Patent Number: 4,547,528

[45] Date of Patent: Oct. 15, 1985

[54] METHOD OF PREVENTING SCORCH IN A POLYURETHANE FOAM AND PRODUCT THEREOF

[75] Inventors: Barry A. Jacobs, Bethel; Michael J. Reale, Fairfield, both of Conn.

[73] Assignee: Stauffer Chemical Company, Westport, Conn.

[21] Appl. No.: 686,315

[22] Filed: Dec. 24, 1984

[51] Int. Cl.$^4$ .................... C08G 18/14; C08G 18/30; C08G 18/32
[52] U.S. Cl. .................... 521/121; 521/128
[58] Field of Search .................... 521/121, 128

[56] References Cited

U.S. PATENT DOCUMENTS

| | | | |
|---|---|---|---|
| 2,995,564 | 8/1961 | Duennanberger et al. | 260/307 |
| 3,138,571 | 6/1964 | Popoff | 260/45.9 |
| 3,157,615 | 11/1964 | Stahly | 260/45.9 |
| 3,637,865 | 1/1972 | Haring | 260/611.5 |
| 3,798,184 | 3/1974 | Cuscurida et al. | 260/2.5 |
| 3,846,351 | 11/1974 | Huffaker et al. | 521/163 |
| 3,931,060 | 1/1976 | Schubart et al. | 260/2.5 |
| 4,021,385 | 5/1977 | Austin et al. | 521/128 |
| 4,130,513 | 12/1978 | Reale et al. | 521/163 |
| 4,143,219 | 3/1979 | Hensch | 521/107 |
| 4,146,687 | 3/1979 | Reale | 521/128 |
| 4,178,420 | 12/1979 | Reale | 521/128 |
| 4,228,247 | 10/1980 | Moore et al. | 521/107 |
| 4,235,975 | 11/1980 | Preston et al. | 521/128 |
| 4,363,745 | 12/1982 | Hinze | 521/128 |
| 4,404,300 | 9/1983 | Koski et al. | 524/91 |
| 4,444,676 | 4/1984 | Statton et al. | 521/128 |

OTHER PUBLICATIONS

Chem. Abs. 65, 7340f (J. Lante, Ciba–Rundschau, 1964, p. 42).

Chem. Abs. 89, 11164b (Japan Kokai, 78/00262).

*Primary Examiner*—Herbert S. Cockeram
*Attorney, Agent, or Firm*—Richard P. Fennelly

[57] ABSTRACT

Incorporation of from about 0.001% to about 5% of a mixture of an N-alkanoyl-N,N'-dialkyl-phenylenediamine compound (e.g. N-heptanoyl-N,N'-di-sec-butyl paraphenylenediamine) and a fluorescent brightener (e.g., a bis(benzoxazole) substituted thiophene) in a flame retarded polyurethane foam formulation stabilizes the formulation against scorching as the foam is formed therefrom.

16 Claims, No Drawings

METHOD OF PREVENTING SCORCH IN A POLYURETHANE FOAM AND PRODUCT THEREOF

BACKGROUND OF THE INVENTION

1. Field of the Invention

The present invention relates of a method for stabilizing a flame retarded polyurethane foam against scorching and the product thereof.

2. Description of the Prior Art

In copending U.S. Application Ser. No. 682,520, filed on Dec. 17, 1984, of Barry A. Jacobs, entitled "Method of Preventing Scorch in a Polyurethane Foam and Product Thereof", it was proposed to use an N-alkanoyl-N,N'-dialkylphenylenediamine compound as a scorch inhibitor in a flame retarded polyurethane foam formulation. The compounds of this type were effective in curing the thermal scorch which occurred due, most likely, to the degradation of the halogen-phosphorus flame retardants customarily used in such foams.

A second type of discoloration, which is deemed to be a chemical scorch, can be ameliorated by a combined use of one or more of the aforementioned substituted N,N'-dialkylphenylenediamine compounds and a fluorescent (or "optical") brightener.

DETAILED DESCRIPTION OF THE PRESENT INVENTION

The present invention relates to the combined use of an N-alkanoyl-N,N'-dialkylphenylenediamine compound and a fluorescent brightener to cure scorch in a flame retarded polyurethane foam.

The N-alkanoyl-N,N'dialkyl phenylenediamine compounds intended for use herein have the formula:

$$(H)(R)NC_6H_4N(R)(COOR^1)$$

wherein R and $R^1$ can be the same or different and are straight chain or branched alkyl, e.g., $C_1$–$C_{10}$ alkyl. The nitrogen atoms are preferably para- on the benzene ring although ortho- and meta-isomers can also be utilized. A preferred compound is N-heptanoyl-N,N'-di-sec-butyl-paraphenylenediamine.

The substituted phenylenediamine compounds intended for use herein are preferably formed by acylating a N,N'-dialkyl phenylenediamine reagent with the appropriate alkanoic acid under any of the well known acylation conditions. The reaction can be carried out at an elevated temperature, normally in the range of from about 100° to 300° C. Alternatively, the phenylenediamine reagent can be reacted with the acid anhydride of the appropriate acid at a temperature of about 20°–200° C. The third method involves reacting the phenylenediamine reagent with the selected alkanoyl chloride at a temperature of about 20°–150° C. If either the second or third route is used, an acid acceptor such as a tertiary amine can be employed to improve the yield and prevent side reactions. Pyridine appears to be particularly suitable although any art recognized acid acceptors can be used. Such processes are described in British Pat. No. 1,326,875.

The fluorescent brighteners which are intended to be used in the present invention are those which are compatible with the flame retarded polyurethane foams. Preferred are the bis(benzoxazolyl) substituted thiophenes, e.g., a 2,2'-(2,5-thiophenediyl) bis[5-alkylbenzoxazole]. One particularly preferred compound is 2,2'-(2,5-thiophenediyl)bis[5-(1,1-dimethylethyl)benzoxazole] which is commercially available under the trademark UVITEX OB from Ciba-Geigy Corporation.

The alkanoyl-N,N'-dialkyl-phenylenediamine compound or compounds and the brightener or brighteners can be incorporated in any of the type of foam formulations described, for example, in U.S. Pat. No. 4,143,219, which is incorporated herein by reference, in order to stabilize the polyurethane foam against scorching. The amount of such compounds which are used, if calculated on the basis of their admixture, can range from about 0.01% to about 5% by weight of the foam formulation, preferably from about 0.2% to about 3% by weight, of the formulation. The weight ratio of phenylene-diamine to brightener in the mixture can range from about 10:1 to about 1:1. Such foam formulations are prepared by mixing an organic isocyanate with a polyol compound which is, preferably, a polyol having a molecular weight in the range of from about 3000 to about 5600. Particularly preferred polyurethane foam formulations are those flexible and low density foams which contain such organophosphorus flame retardants as the homopolymerization product of tris(2-chloroethyl)phosphate, the copolycondensation product of bis(2-chloroethyl)vinylphosphate and dimethyl methylphosphonate, the polycondensation product of tris(2-chloroethyl)phosphate and dimethyl methylphosphonate. Such products are described in U.S. Pat. Nos. 3,513,644, 3,641,202, 3,695,925, 3,822,327 and 3,855,359.

The present invention will be further illustrated by the Examples which follow:

EXAMPLE 1

The following foam formulation was prepared:

| REAGENT | AMOUNT |
| --- | --- |
| Toluene Diisocyanate | 1696.5 g |
| Polyol (CP 3000 sold by Dow Chemical Co.) | 2900 g |
| Condensed tris (2-chloroethyl) phosphate | 232 g |
| N—heptanoyl-N,N'—di-sec-butyl-p-phenylenediamine (Ex. 1) | 4.6 g |
| Silicone surfactant | 29 g |
| 33LV/NEM(6:1) initiator | 7.25 g |
| Water | 133 g |
| T-10 Stannous octoate initiator | 16 g |

The above ingredients were premixed for 45 seconds after which the toluene diisocyanate was added. The resulting formulation was mixed for 9.5 seconds and was then poured into a large box. A recording probe was inserted into the foam at this time and recorded a maximum temperature of 147° C. The foam was allowed to remain for 22 hours and was then cut open. The inside of the foam showed only slight scorching.

EXAMPLE 2

The procedure of Example 1 was repeated with the exception that 0.001% of 2,2'-(2,5-thiophenediyl)bis[5-(1,1-dimethylethyl)benzoxazole], which is commercially available under the trademark UVITEX OB from Ciba-Geigy Corp., was incorporated in the foam formulation. The foam of this Example showed less scorch that the one of Example 1 where just the phenylenediamine compound described therein was used.

The foregoing Examples are intended to illustrate certain preferred embodiments of the claimed invention whose scope is set forth in the appended claims.

We claim:

1. A method for stabilizing a flame retarded polyurethane foam composition against scorching which comprises incorporating in said composition of an effective amount of a mixture of an N-alkanoyl-N,N'-dialkylphenylenediamine compound and a fluorescent brightener for scorch inhibition.

2. A method as claimed in claim 1 wherein the amount of mixed phenylenediamine compound and brightener which is incorporated in the composition ranges from about 0.001% to about 5% by weight of the foam formulation.

3. A method as claimed in claim 1 wherein the foam is formed by reaction of an organic isocyanate and a polyether polyol.

4. A method as claimed in claim 3 wherein the polyether polyol has an molecular weight which ranges from about 3000 to about 5600.

5. A method as claimed in claim 1 wherein the phenylenediamine compound has the formula:

$(H)(R)NC_6H_4N(R)(COOR^1)$ wherein R and $R^1$ are $C_1$–$C_{10}$ alkyl.

6. A method as claimed in any of claims 1–5 wherein the phenylenediamine is N-heptanoyl-N,N'-di-sec-butyl-para compound phenylenediamine.

7. A method as claimed in any of claims 1–5 where the brightener is a bis(benzoxazolyl) substituted thiophene.

8. A method as claimed in any of claims 1–5 where the brightener is 2,2'-(2,5-thiophenediyl)bis[5-(1,1-dimethylethyl)benzoxazole].

9. A flame retarded polyurethane foam composition stabilized against scorching which contains an amount of a mixture of an N-alkanoyl-N,N'-dialkylphenylenediamine compound and a fluorescent brightener effective for scorch inhibition.

10. A composition as claimed in claim 9 wherein the amount of phenylenediamine compound and brightener is about 0.2% to 3% by weight of the composition.

11. A composition as claimed in claim 9 wherein the foam is formed from reaction of a composition which comprises an organic isocyanate and a polyether polyol.

12. A composition as claimed in claim 11 wherein the polyether polyol has an molecular weight which ranges from about about 3000 to about 5600.

13. A composition as claimed in claim 9 wherein the phenylenediamine compound has the formuls $(H)(R)NC_6H_4N(R)(COOR^1)$ wherein R and $R^1$ are $C_1$–$C_{10}$ alkyl.

14. A composition as claimed in any of claims 9–13 wherein the phenylenediamine compound is N-heptanoyl-N,N'-di-sec-butyl para-phenylenediamine.

15. A composition as claimed in any of claims 9–13 where the brightener is a bis(benzoxazolyl) substituted thiophene.

16. A composition as claimed in any of claims 9–13 where the brightener is 2,2'-(2,5-thiophenediyl)bis[5-(1,1-dimethylethyl)benzoxazole].

* * * * *

UNITED STATES PATENT AND TRADEMARK OFFICE
CERTIFICATE OF CORRECTION

PATENT NO. : 4,547,528
DATED : October 15, 1985
INVENTOR(S) : Barry A. Jacobs, Michael J. Reale It is certified that error appears in the above—identified patent and that said Letters Patent is hereby corrected as shown below:

Col. 1, line 8, change "of" before "a method" to -- to --;

Col. 2, line 63, change "that" to -- than --;

Col. 3, line 4, delete "of" before "an effective";

Col. 3, line 18 and Col. 4, line 16, change "an" to -- a -- before "molecular weight"; and Col. 4, line 19, change "formuls" to -- formula --.

Signed and Sealed this

Twenty-eighth Day of January 1986

[SEAL]

Attest:

DONALD J. QUIGG

Attesting Officer

Commissioner of Patents and Trademarks